(12) United States Patent
Shoemaker, Jr.

(10) Patent No.: US 11,584,597 B1
(45) Date of Patent: Feb. 21, 2023

(54) SUCTION CUP SYSTEM FOR PICKING UP FLEXIBLE PLASTIC BAGS

(71) Applicant: Stephen P. Shoemaker Trust, Manhattan Beach, CA (US)

(72) Inventor: Stephen P. Shoemaker, Jr., Redondo Beach, CA (US)

(73) Assignee: Stephen P. Shoemaker Trust, Manhattan Beach, CA (US)

( * ) Notice: Subject to any disclaimer, the term of this patent is extended or adjusted under 35 U.S.C. 154(b) by 0 days.

(21) Appl. No.: 17/974,912

(22) Filed: Oct. 27, 2022

(51) Int. Cl.
*B65G 47/90* (2006.01)
*B65G 47/91* (2006.01)
*B25J 15/06* (2006.01)
*G07F 11/16* (2006.01)

(52) U.S. Cl.
CPC .......... *B65G 47/91* (2013.01); *B25J 15/0616* (2013.01); *B65G 2201/0238* (2013.01); *G07F 11/1657* (2020.05)

(58) Field of Classification Search
CPC ............. B65G 47/91; B65G 2201/0238; B25J 15/0616; G07F 11/1657

USPC ......................................................... 294/186
See application file for complete search history.

(56) References Cited

U.S. PATENT DOCUMENTS

| 6,397,748 B1 * | 6/2002 | Schmitt | B41F 27/1275 101/477 |
| 2008/0021595 A1 * | 1/2008 | Chirnomas | G07F 11/04 221/92 |

\* cited by examiner

*Primary Examiner* — Ronald P Jarrett
(74) *Attorney, Agent, or Firm* — Fulwider Patton LLP

(57) ABSTRACT

A machine for use in picking up objects having a cellophane outer covering using a vacuum, the machine comprising a housing, a vacuum source, a suction cup coupled to the vacuum source, a transport system for moving the suction cup horizontally and vertically within the housing, and a plurality of objects having a cellophane outer covering in the housing below the pick-up device. The plurality of objects include an adhesively applied target on at least one of the cellophane outer coverings, the adhesively applied target having a surface area greater than a surface area circumscribed by a lowermost edge of the suction cup, and the suction cup includes a threaded tubular member extending axially therein through, the threaded tubular member including stops that engage an upper and lower surface of the suction cup.

3 Claims, 4 Drawing Sheets

SUCTION CUP SYSTEM FOR PICKING UP FLEXIBLE PLASTIC BAGS

BACKGROUND

Crane type arcade games are prevalent in arcades, restaurants, bars, waiting areas, and the like. While the original games used a mechanical claw that players maneuvered to capture a prize at the bottom of a bin, the prizes were limited to plush toys, balls, and specific toys because of the limitations of the mechanical claw.

One solution to the inability of claw-type cranes to pick up these objects is to provide a different type of pick-up device. One type of device that is used is a vacuum device that uses air suction to grab and hold an object. In U.S. Pat. No. 5,513,772 of Glaser, a vacuum embodiment of a crane pick-up game is disclosed in which a vacuum motor is suspended from a string and concealed by a facade or enclosure. The player may lower the vacuum cup towards a field of prizes similarly to the claw in claw-type crane games. A vacuum cup creates a suction force that is used to pick up and hold prizes. An orifice with a screen is used to prevent items from being sucked into the orifice. Prizes captured and held by the suction are dispensed to the player through a dispenser.

More recent vacuum crane games have improved on the concept and made the game more challenging. In my U.S. Pat. No. 5,855,374, a vacuum crane game is disclosed wherein the vacuum cup is used to pick up one of the prizes using a suction force that is provided by a vacuum pump coupled to the vacuum cup by a hose and located away from the vacuum head. Moving the pumping apparatus away from the crane head mechanism provides greater maneuverability than previous devices that carried the pumping equipment at the crane head. In general, the vacuum crane game is characterized by a vacuum pick up device positioned above the prize or target area and may be moved along a horizontal axis above the prize area. The pick-up device includes a vacuum head that may be raised and lowered toward a turntable in a z-direction. The vacuum head is operative to pick up one of the prizes using a suction force that is provided by a vacuum pump coupled to the vacuum head by a hose. The vacuum pump is located away from the vacuum head to allow the vacuum head to move without interference. The player may control the movement of the pick-up device to position the vacuum head over the prize area at a desired position, lower the vacuum head, and pick up a prize using the suction force. The pick-up device is moved to a dispenser area and the suction force is removed to allow the prize to be dispensed to the player. The disclosure of my '374 patent is incorporated fully herein by reference. In another embodiment, the vacuum head may be moved in both x- and y-directions above the prize area and the turntable is omitted.

With vacuum crane games, it is desirable to provide prizes having smooth continuous surfaces such that a seal can be formed by the vacuum cup against the prize. Without a complete seal, the vacuum cup cannot effectively apply suction to the prize sufficiently to enable the prize to be lifted out of the prize bin. As a consequence, prizes such as jewelry, trading cards, candy, and toys are typically enclosed in transparent or opaque spheroids such as spheres and egg-shaped plastic containers. Such spheroids will have exteriors that meet the requirement of smooth, continuous surfaces allowing the vacuum cup to make complete, sealing contact. An example of this type of prize collection for a vacuum crane game can be found in my U.S. Pat. No. 6,598,881, entitled "Crane Game with Prize Redistribution Mechanism" and incorporated herein fully by reference.

One type of prize that is not usually available to game manufacturers and owners is the litany of snacks and foodstuffs that are packaged in flexible cellophane bags, such as chips, pretzels, cookies, pastries, etc., because a suction cup will not make a satisfactory seal with such objects to enable it to pick them up. However, these types of prizes are very attractive to game players and it would be advantageous to have a system that can reliably pick up these types of prizes from a game bin in a way such that a vacuum pick-up device can both make effective contact with the prize and the suction connection will be maintained through the pick-up and lateral movement phases.

Vacuum pick-up devices use a suction cup with a vacuum tube communicated to the interior. When the suction cup makes contact with an object, the outer rim of the cup forms a seal, and the negative pressure inside the cup due to the vacuum tube is sufficient to connect the prize to the cup as long as the seal around the cup's rim is not disturbed. As the negative pressure is applied, the soft cup material causes the rim to expand as the cup is compressed, so that the rim moves radially outward during the attachment of the cup. If the object on which the cup is attached is solid, this expansion of the cup is inconsequential as the seal is not broken during the slight movement of the cup's rim on the contact surface. However, cellophane surfaces are incapable of supporting a suction cup as the surfaces form ridges and uneven surfaces that cause the vacuum seal to be compromised, and once the air can escape across the seal the object can no longer be picked up. Therefore, using the current system prizes that have cellophane outer coverings such as snacks and chips do not work well with the current system.

SUMMARY OF THE INVENTION

The present invention is a two-fold remedy to overcome the shortcomings of the current system. First, the prizes can be modified by placing an adhesively applied target onto the prize that will not buckle or crinkle when the suction cup is placed on the prize. The target can be made of a paper or plastic material with a surface that is adapted to easily attach to the suction cup and not lose the seal when the cup is over the target and the vacuum is applied. The target can be chosen to have a diameter that determines a level of difficult in capturing the prize in light of the more secure attachment. That is, the skill required to place the suction cup precisely over the target depends on the diameter of the target and the diameter of the suction cup. The closer these two measurements are, the more difficult it is to capture the prize.

The second feature of the present invention is the use of a rigid member to control the expansion of the suction cup on the target. Suction cups come in numerous shapes, configurations and sizes. As described above, a common feature of all cups is that the circumference of the pick-up end increases when the vacuum is applied. Manufacturers have tried to decrease this expansion by having bumps or cleats inside the cup that hit the object preventing the cup from collapsing completely thus reducing the expansion of the outer rim. This partially affects the cup's expansion but these fixes are preset and not adjustable. The ability to adjust the amount/extent of the circumferential expansion would be preferable to assist in the win rate of the game.

The present invention uses a threaded member that extends through the center of the suction cup, and includes stops in the form of washer/nut combinations that set the maximum compression of the suction cup, and by association the amount of circumferential expansion. Present suction cups of silicone or soft rubber is not historically amenable to a threaded connection because of the lack of strength of the material. However, the present invention uses a threaded channel down the middle of the suction cup that retains a fastener. The threaded fastener is passed through the threaded channel through the cup and synching nuts are positioned along the upper and lower surfaces of the cup. This way the threaded fastener can be adjusted, minutely, controlling the amount of movement (compression) with delicate accuracy. The less distance between the threaded fastener and the prize the less compression of the soft cup and the less variation in the diameter of the rim of the cup. This is very important with a cup/target game or other machines where tolerance is critical.

DETAILED DESCRIPTION OF THE PREFERRED EMBODIMENTS

Figure 1:
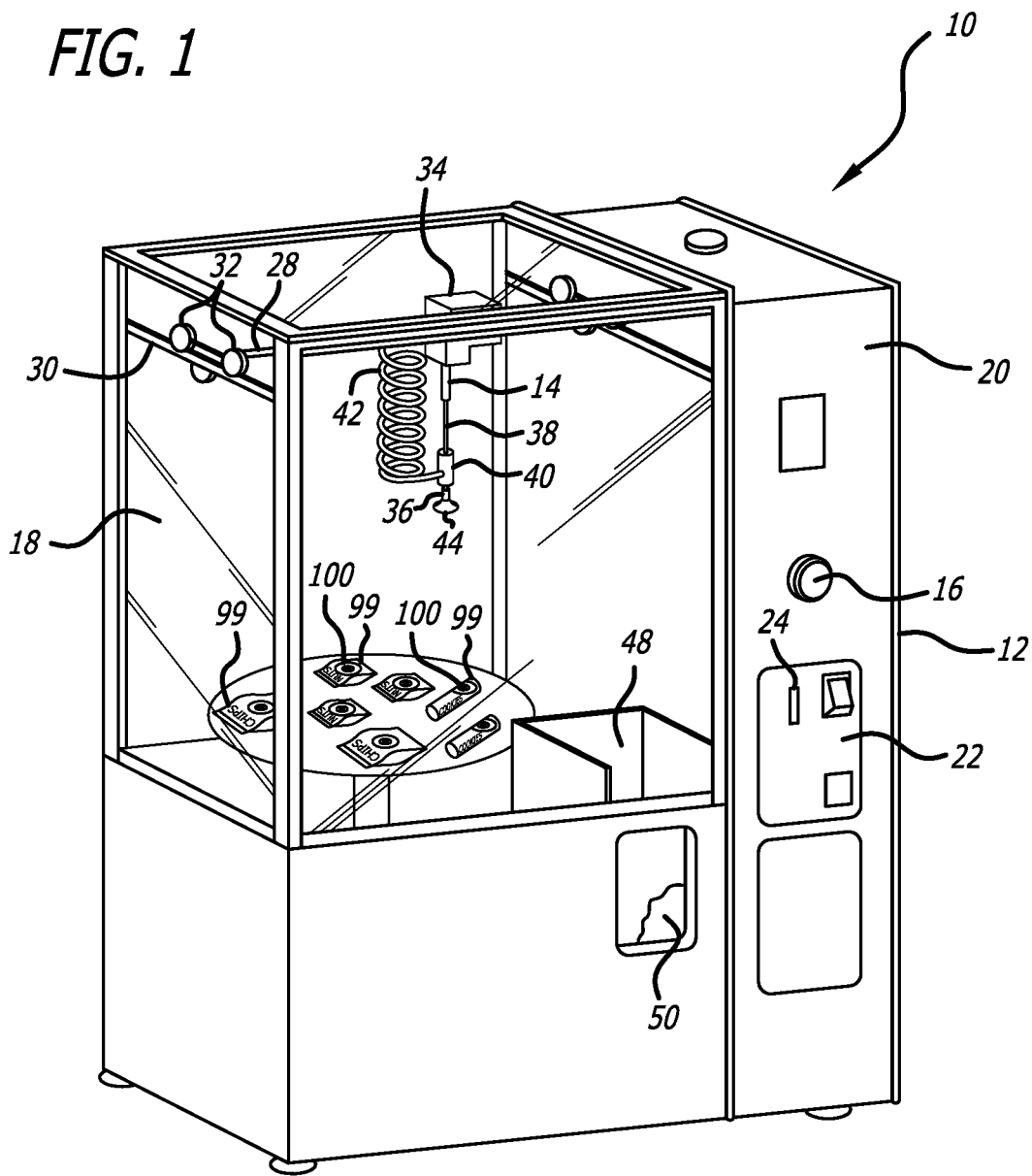
FIG. 1 is an elevated perspective view of a first preferred embodiment of the present invention.

FIG. 1 is a perspective view of one embodiment of a game apparatus 10 in accordance with the present invention. Game apparatus 10 includes a housing 12, vacuum crane 14, player controls 16, and a prize area 18. The construction and operation of a vacuum crane game is known to one of ordinary skill in the art, and extensive discussion of the construction and operation of the vacuum crane game is omitted in favor of a brief overview for the sake of brevity.

A crane game 10 includes a housing 12 divided into two sections, a prize area 18 on a first half of the housing and a storage compartment 20 on the other half of the housing. The storage compartment 20 can enclose pumping equipment and the electronics to manipulate the vacuum crane 14 and produce any sounds or visual effects that accompany the game play. The storage compartment 20 can also provide a repository for surplus prizes as the inventory in the prize area 18 is depleted. On the housing 12 is a control panel 22 including a slot 24 for receiving the tokens, coins, money, or game cards that initiates a game play. The control panel 22 further includes a controlling device such as a joystick or button 16, or the like for maneuvering the crane 14 within the target bin 18. The target bin 18 includes a boom 28 spanning its width and driven along two horizontal rails 30 on a set of rollers 32. Using the controlling device 16 to actuate an electrical motor, the boom 28 can be positioned along the path between the front and rear walls of the target bin. Other types of conveyor systems are also considered part of the invention.

In addition to controlling the position of the boom in the forward/rearward direction, a carriage assembly 34 rides on the boom 28 and translates across the boom 28 from the left side to the right side of the target bin 18. Once again, the controlling device 16 initiates movement of the carriage assembly 34 along the boom 28 such that, by manipulating the controlling device in a particular manner the carriage assembly 34 can be positioned substantially over any prize 99 in the prize area 18. The carriage assembly 34 is driven by an electric motor or other device that is controlled by the button 16, a joystick, touchpad, or other similar input device.

The crane assembly 14 includes a suction cup 44 suspended on a crane by a retractable cable 38 and weight assembly 40, and further connected to a coiled suction line 42 leading to a vacuum source such as a pump 200, wherein suction from the pump 200 is communicated through the suction line 42 to the upper end of a threaded tubular member 36 that passes into the suction cup 44. The suction cup 44 is lowered onto the prizes below with the intent to place the suction cup onto a target adhered to the prize 99 as explained below. When the suction cup 44 is engaged with a target 100 on a prize 99 in a sealing relationship and suction is communicated to the suction cup through the threaded member 36, a negative pressure inside the suction cup causes the target 100 and therefore the prize to adhere to the suction cup 44 and be captured. As long as suction is maintained at the suction cup and the seal between the target 100 and the suction cup is maintained, the captured prize 99 will remain held connected.

The vacuum crane game 10 may include a sensing mechanism (not shown) that determines when a prize 99 has been captured by the suction cup 44, and initiates an operation whereby the suction cup 44 is raised above the collection of prizes 99 and directed to an extraction chute 48 separated from the prizes. The suction source is automatically disconnected when the suction cup 44 is over the extraction chute 48, causing the captured prize to fall into the extraction chute where it enters a compartment 50 that can be accessed by the player. The challenge for the skilled player is to identify a prize first and then using the controlling device 16 maneuver the suction cup 44 appropriately until it is directly above a target 100 on a prize, and then the suction cup is lowered onto the target 100 until mating results in capture and finally extraction.

Figure 2:
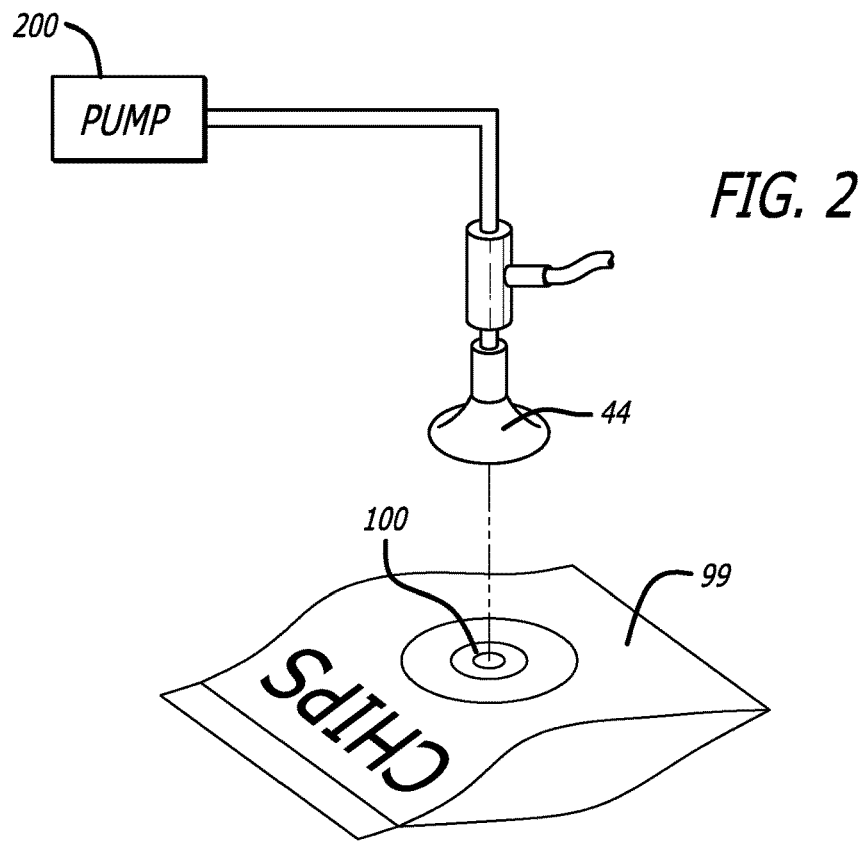
FIGS. 2 and 3 are enlarged, perspective views of the vacuum cup picking up a cellophane wrapped prize.
Figure 3:
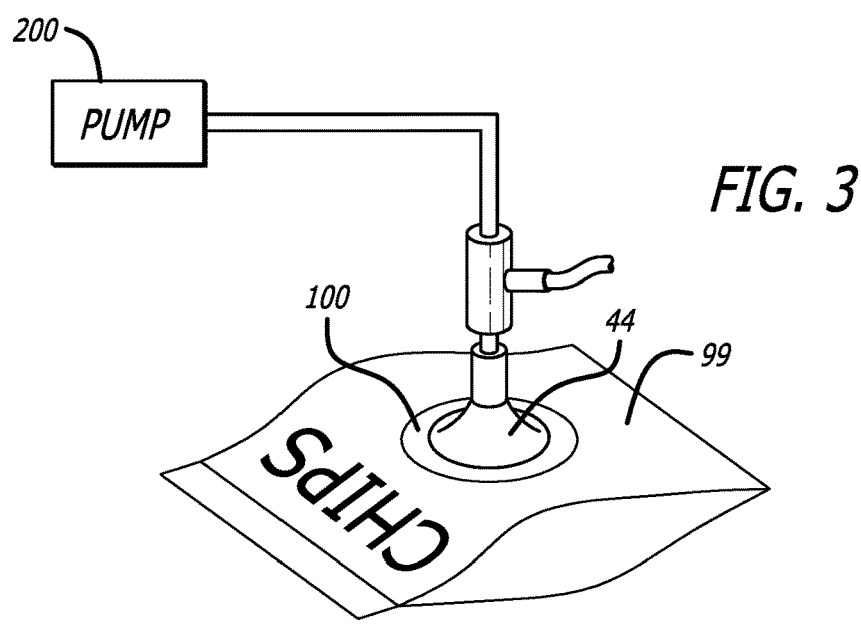

FIGS. 2 and 3 illustrate the pick up device including the suction cup 44 attempting to pick up a prize 99 including a cellophane wrapping, as is common with foodstuffs such as chips, nuts, cookies, candies, pre-packaged pastries, etc. Because the suction cup does not work well on cellophane, the prize 99 has been modified to include a sticker or decal 100, preferably in the shape of a bullseye, that is not made of cellophane and more capable of being captured by the suction cup 44. The target 100 is centrally located on the prize, and if the suction cup 44 lands on the target as shown in FIG. 3, the prize 99 can be readily picked up and delivered to the player. If the suction cup 44 is only partially located on the target 100, the prize will not be picked up and the player loses the attempt. The size of the target can be adjusted using different size stickers to adjust the difficulty level for each prize 99.

Figure 4:
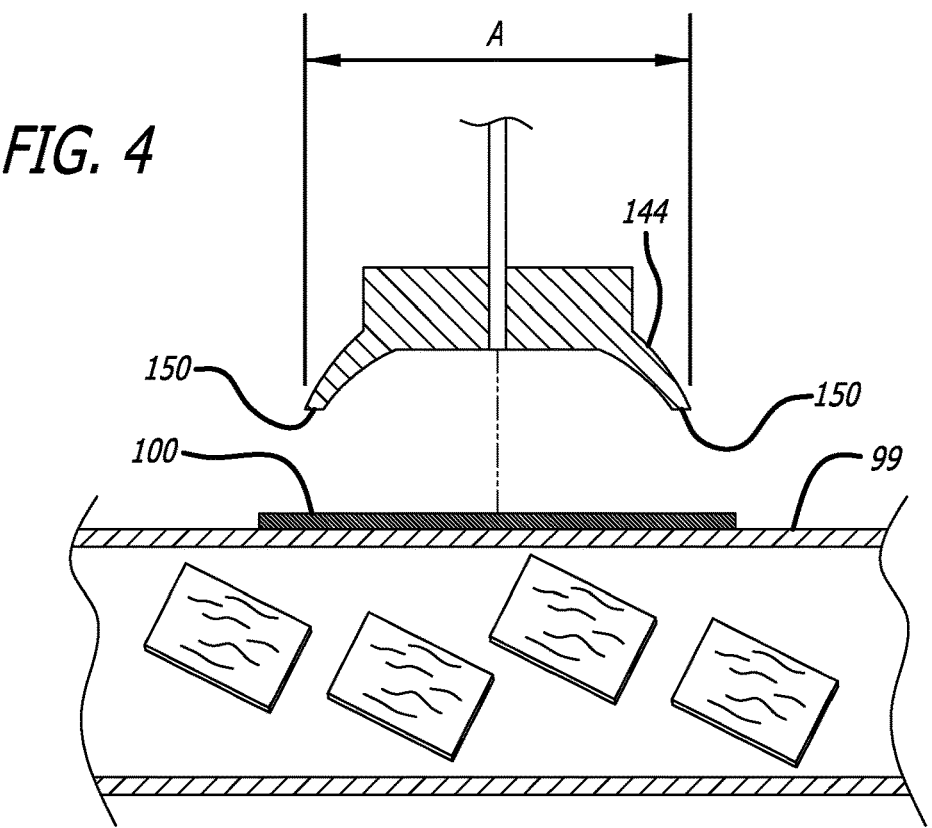
FIGS. 4 and 5 are views of the suction cup without the adjustable fastener unable to pick up the prize.
Figure 5:
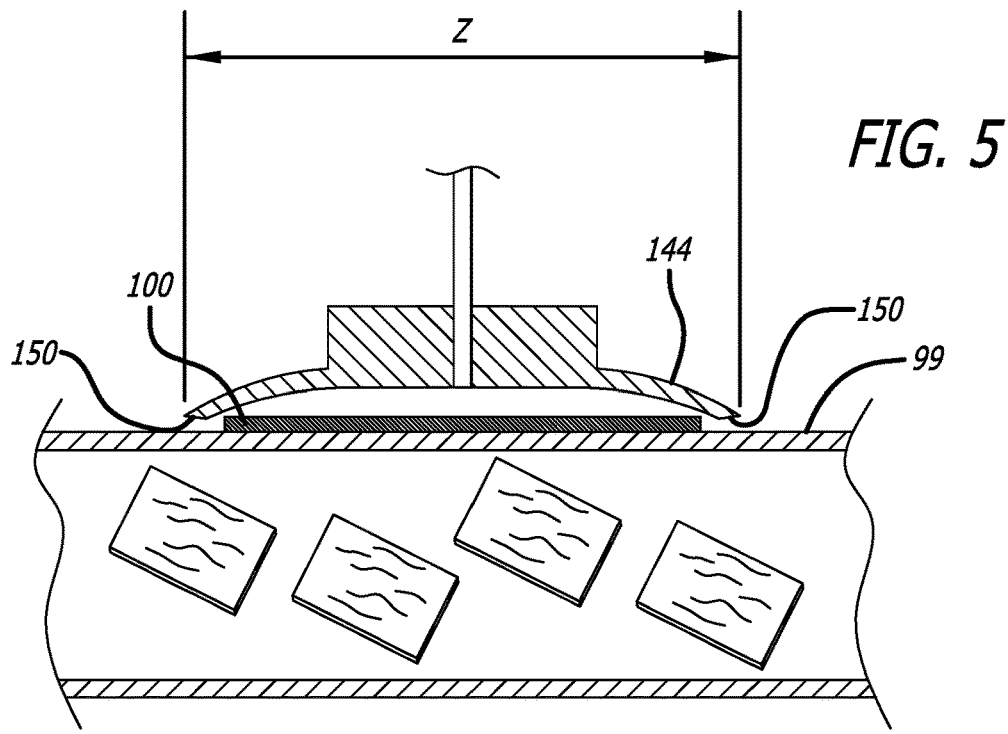

FIGS. 4 and 5 illustrate on problem that is encountered with the foregoing system. When the suction cup 144 is lowered onto the prize and suction from the pump 200 is applied, the suction cup tends to collapse and flatten out, increasing the diameter at the edge 150 from its undeformed distance A in FIG. 4 to its enlarged distance Z in FIG. 5. In many cases, this expansion will move the edge 150 of the suction cup 144 off of the target as shown in FIG. 5, causing the vacuum to be lost and/or the prize to slip off through no fault of the player.

Figure 6:
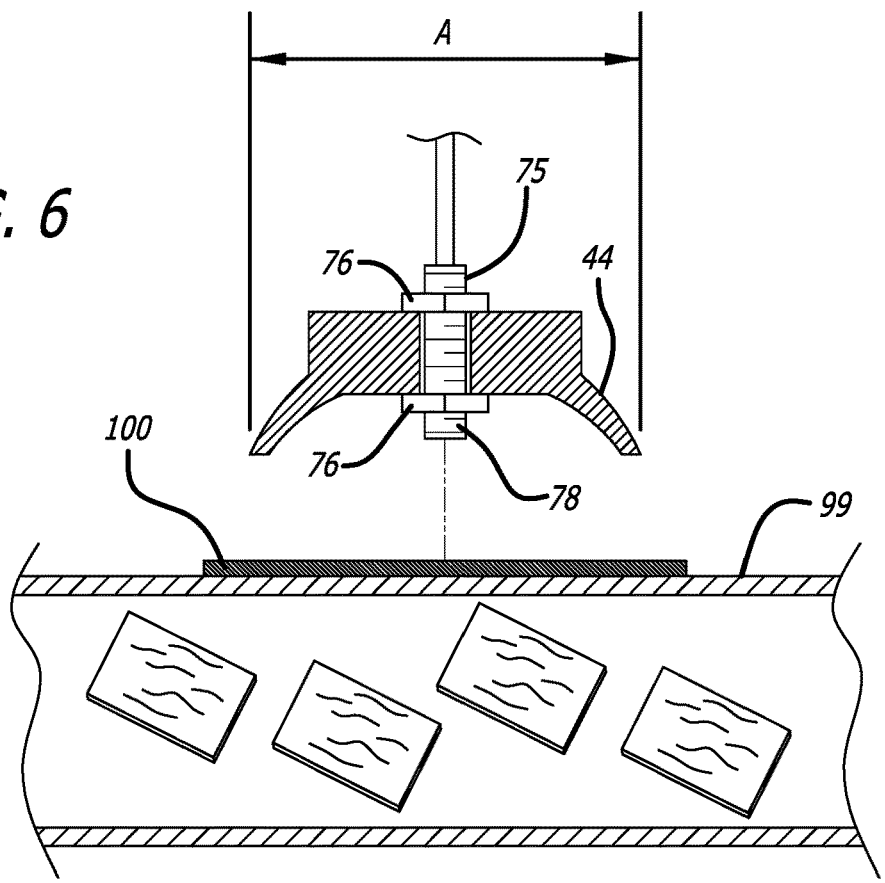
FIGS. 6 and 7 are views of the suction cup with the adjustable fastener to allow the suction cup to remain on the target and pick up the prize.
Figure 7:
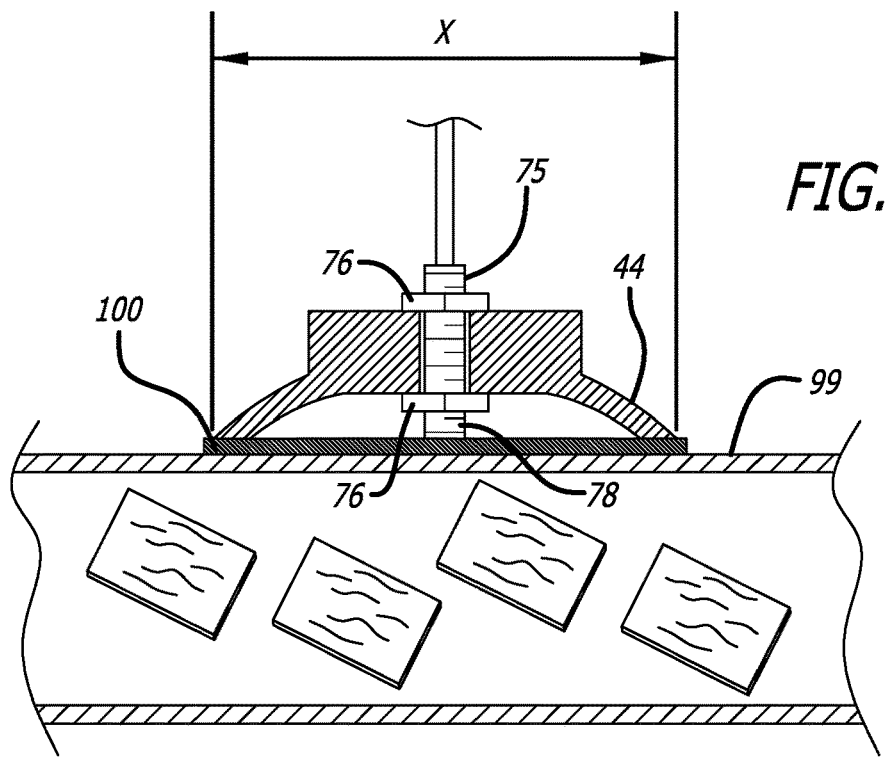

To prevent this from occurring, FIGS. 6 and 7 show a modified suction cup 44 that includes a threaded tube 75 passing through the center of the suction cup 44 so that a portion of the threaded tube 75 extends downward from the base of the suction cup as shown in FIGS. 6 and 7. The vacuum line conveying the negative pressure is passed through the tube to the suction cup's interior to transmit the vacuum to the suction cup. The threaded tube is located in the suction cup with two nuts 76 and because of the threads on the threaded tube 75, the lower end 78 of the threaded tube 75 can be positionally adjusted. When the lower end 78 of the threaded tube 75 makes contact with a prize surface, the collapse of the suction cup is arrested and the distance X is less than the diameter of the target as shown in FIG. 7. This adjustable threaded tube 75 therefore prevents the suction cup from expanding beyond the width of the target 100 to overcome the problem identified in the paragraph above.

While the inventor's preferred embodiments have been disclosed and depicted, the invention should not be considered limited to only those embodiments described and depicted. A person of ordinary skill in the art would readily recognize various substitutions, modifications, and alterations, and the invention is intended to include all such variations as part of the invention. Accordingly, the scope of the invention is properly measured by the appended claims using their ordinary meanings, consistent with but not limited to the descriptions and depictions herein.

I claim:

1. A machine for use in picking up objects having a cellophane outer covering using a vacuum, the machine comprising:

a housing;

a vacuum source;

a suction cup coupled to the vacuum source;

a transport system for moving the suction cup horizontally and vertically within the housing; and a plurality of objects having a cellophane outer covering in the housing;

wherein the plurality of objects include an adhesively applied target on at least one surface, the adhesively applied target having a surface area greater than a maximum surface area circumscribed by a lowermost edge of the suction cup, the target having a greater rigidity than the cellophane outer covering; and wherein the suction cup includes a threaded tubular member extending axially therein through, the threaded tubular member fluidly connected to the vacuum source and adjustably positioned inside the suction cup to limit an extent of collapse of the suction cup when the vacuum source is applied.

2. The machine of claim 1, wherein the machine is an arcade game.

3. The machine of claim 1, wherein the objects having a cellophane covering is a prepackaged food item.

* * * * *